(No Model.)
J. H. CAMPBELL.
ORNAMENTAL WALL COVERING.
No. 333,727. Patented Jan. 5, 1886.
Fig. 1.
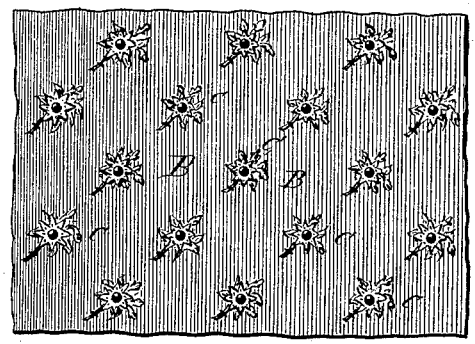
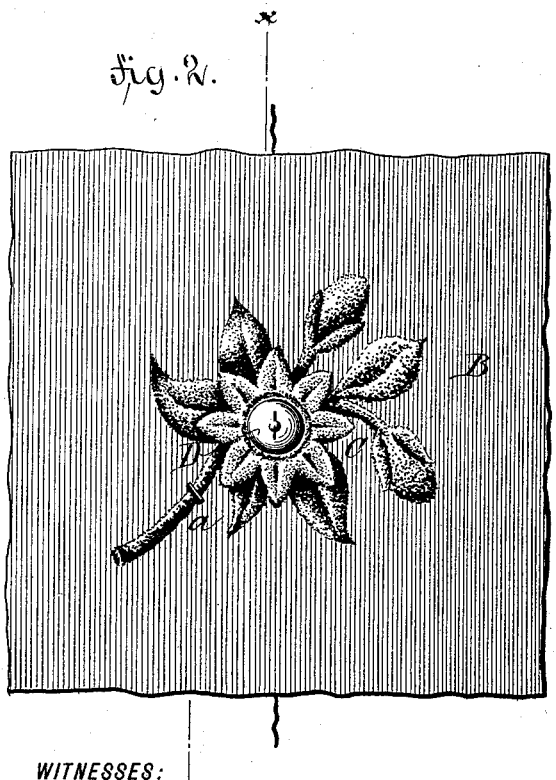
Fig. 2.
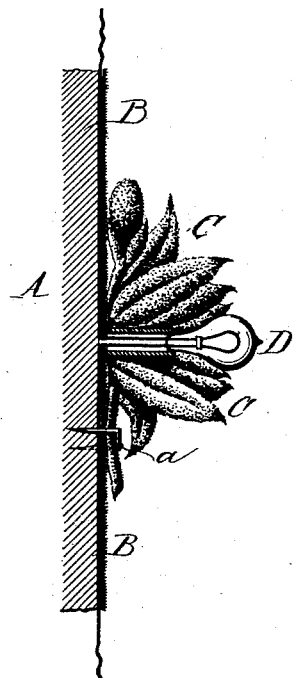
Fig. 3.
WITNESSES:
W. N. Rosenbaum
Martin Petry
INVENTOR
John H. Campbell
BY
Goepel & Raegener
ATTORNEYS.
N. PETERS, Photo-Lithographer, Washington, D. C.

UNITED STATES PATENT OFFICE.

JOHN H. CAMPBELL, OF NEW YORK, N. Y.

ORNAMENTAL WALL-COVERING.

SPECIFICATION forming part of Letters Patent No. 333,727, dated January 5, 1886.

Application filed September 28, 1885. Serial No. 178,344. (No model.)

*To all whom it may concern:*

Be it known that I, JOHN H. CAMPBELL, of the city of New York, in the county of New York and State of New York, have invented certain new and useful Improvements in Ornamental Wall-Coverings, of which the following is a specification.

This invention has reference to an improved ornamental wall-covering whereby artistic effects are obtained; and the invention consists of a wall-covering having artificial flowers attached thereto by suitable means, and incandescent electric lamps arranged in the flowers.

In the accompanying drawings, Figure 1 represents a front view of a section of my improved ornamental wall-covering. Fig. 2 is a front view of a smaller portion drawn on a larger scale; and Fig. 3 is a vertical transverse section on line $x x$, Fig. 2.

Similar letters of reference indicate corresponding parts.

A in the drawings represents the covering of a wall which is made of flock, wall-paper, or any other suitable material. On the covering B are arranged in regular lines or figures bunches of artificial flowers C, the stems of which are attached by staples $a$ to the wall. The artificial flowers C are made of suitably-covered chenille or other suitable material, by which a soft and rich appearance is imparted to the same. The main flower of the bunch is provided at the center with a small incandescent electric lamp, D, the conducting-wire of which are arranged in the wall below the covering B. The artificial flowers are made up in different colors and form during the day a very striking ornamental wall-covering while at night they are illuminated by the electric lights.

The wall-covering is specially adapted for the lobbies of theaters and places of amusement, or for decorating ball-rooms and for similar purposes.

Having thus described my invention, I claim as new and desire to secure by Letters Patent—

A wall-covering provided with artificial flowers attached to said covering, and incandescent electric lamps arranged in said flowers, substantially as set forth.

In testimony that I claim the foregoing as my invention I have signed my name in presence of two subscribing witnesses.

JOHN H. CAMPBELL.

Witnesses:
MARTIN PETRY,
CARL KARP.